UNITED STATES PATENT OFFICE.

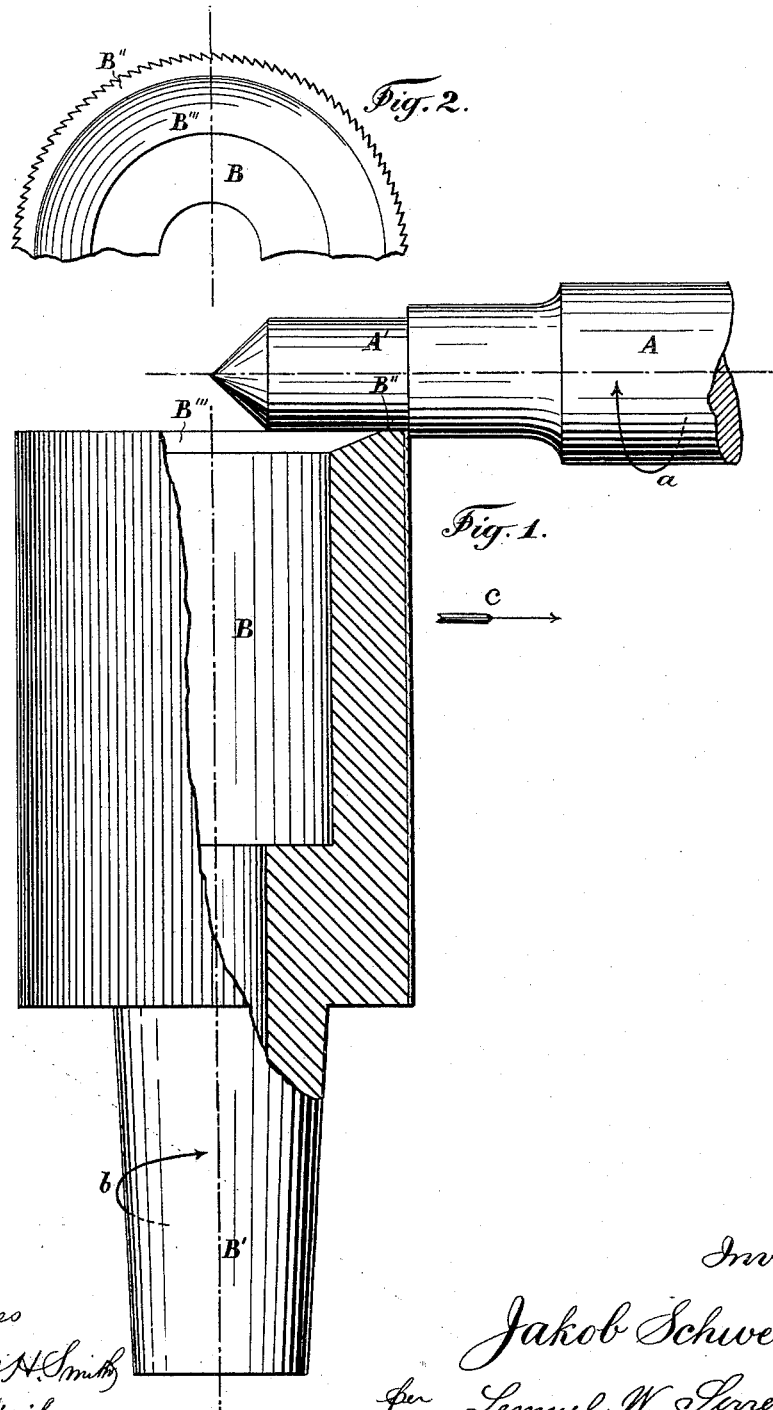

JAKOB SCHWEIZER, OF ZURICH, ASSIGNOR TO MÜLLER & SCHWEIZER, OF SOLEURE, SWITZERLAND.

FILE AND POLISHER.

SPECIFICATION forming part of Letters Patent No. 460,312, dated September 29, 1891.

Application filed May 27, 1891. Serial No. 394,324. (No model.)

*To all whom it may concern:*

Be it known that I, JAKOB SCHWEIZER, engineer, of Zurich, Switzerland, have invented a Combined Cylindrical-Shaped File and Polisher, of which the following is a specification.

The object of this invention is to provide a new or improved tool or cylindrical file capable of working at one and the same time as a file and as a polisher or burnisher, the latter polishing or burnishing the cylindrical surface as produced by the file on the rotating work as fast as the file produces said surface. This will be best understood on reference to the accompanying drawings, in which—

Figure 1 represents the cylindrical file and polisher at work. Fig. 2 is a fragmentary view from left to right of the file B, shown in partial section in Fig. 1.

A is the work—say, for instance, the axis of a watch-wheel—on which there is to be formed a polished pivot A'. The work A is fixed to the axis of a lathe or pivot-lathe and is supposed to rotate in the direction of the arrow $a$.

B is the cylindrical-shaped file, which is fixed to a rotary axis of the machine or pivot-lathe, said axis being placed perpendicularly to and in the same plane as the geometrical axis of the work A. The file B, which rotates in the direction indicated by the arrow $b$, is formed as a hollow cylinder, the outer cylindrical surface of which is grooved or striated, either as shown in the drawings, with grooves running parallel to the geometrical axis of the cylindrical file B or with worm-like grooves, the form of which is in both cases as shown in the face view of the cylinder-shaped file B in Fig. 2.

B' is the stem of the file, and is intended to be fixed to an axis rotating perpendicularly to the axis of the work and moved laterally in the direction of the arrow $c$ in the plane of said axis.

The hollow cylinder of the file B is provided with an annular flat surface B'' and with a spheroidal concavity or recess B'''. The flat surface B'' constitutes the polisher or burnisher. It is ground, smoothed, or polished, by any suitable means whatever, perfectly flat, and the concavity B''' is produced by means of a grinding-wheel, so as to insure the annular face B'' being maintained at a suitable width whenever the said face B'' is worn away by grinding or polishing. Now if this cylindrical-shaped file B be turned in the direction shown by the arrow $b$ and at same time moved laterally in the direction shown by the arrow $c$, the geometrical axis of B being moved parallel to itself, and in the plane in which is placed the geometrical axis of the work A, the grooved or striated cylindrical surface of the file B will cut out or rimmel the piece A, so as to form the pivot A', and the flat surface B'' of the file B will slightly grind and perfectly polish the cylindrical surface of said pivot A' as fast as the latter is formed by the rimmeling action of the file B. The pivot A' will therefore be formed and polished by one and the same tool and at one and the same operation.

Having thus described my invention, I claim—

The combined file and polishing-tool, consisting of the cylinder B, having a grooved or file surface, and a flat smooth circular end forming a polisher or burnisher and a stem at the opposite end, substantially as set forth.

In testimony whereof I have signed my name and affixed my seal to this specification in the presence of two subscribing witnesses.

JAKOB SCHWEIZER. [L. S.]

Witnesses:
HENRY LALHARD,
O. WUNN LUFR.